US008953623B1

(12) United States Patent
Eyada

(10) Patent No.: US 8,953,623 B1
(45) Date of Patent: Feb. 10, 2015

(54) PREDICTIVE NETWORK SERVICES LOAD BALANCING WITHIN A NETWORK DEVICE

(75) Inventor: Hatem Eyada, Elk Grove, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 204 days.

(21) Appl. No.: 13/304,066

(22) Filed: Nov. 23, 2011

(51) Int. Cl.
*H04L 12/28* (2006.01)
(52) U.S. Cl.
USPC .......................................................... 370/401
(58) Field of Classification Search
CPC ................................................. H04L 29/06176
USPC .................... 370/352, 401, 329, 392; 709/245
See application file for complete search history.

(56) References Cited

U.S. PATENT DOCUMENTS 7,865,624 B1 * 1/2011 Hendel et al. .................. 709/250
8,234,409 B2 * 7/2012 Paunikar et al. ............... 709/245

OTHER PUBLICATIONS

U.S. Appl. No. 13/172,556, filed Jun. 29, 2011 entitled Mobile Gateway Having Decentralized Control Plane for Anchoring Subscriber Sessions.
Rigney et al. "Remote Authentication Dial in User Service (RADIUS)", Network Working Group, Request for Comments 2865, Standards Track, The Internet Society, Jun. 2000, 77 pgs.

* cited by examiner

*Primary Examiner* — Chandrahas Patel
(74) *Attorney, Agent, or Firm* — Shumaker & Sieffert, P.A.

(57) ABSTRACT

In general, techniques are described for performing load balancing across resources of a network device. In one example, upon receiving an initial packet, a load balancer module of the network device is configured to perform a lookup in a routing table based on a subscriber identifier associated with the initial packet, and determine whether a line card is pre-assigned to process the initial packet based at least in part on the lookup result. A packet forwarding engine is configured to when one of the line cards is pre-assigned, direct the initial packet to the pre-assigned line card, and, when one of the line cards is not pre-assigned, dynamically identify one of the line cards to process the initial packet based at least in part on header information of the initial packet, and direct the initial packet to the dynamically identified line card.

20 Claims, 6 Drawing Sheets

PREDICTIVE NETWORK SERVICES LOAD BALANCING WITHIN A NETWORK DEVICE

TECHNICAL FIELD

This disclosure relates to computer networks and, more particularly, distribution of network traffic processing across a network device.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Groups of packets exchanged between a source device and a destination device may be referred to as a network traffic flow. Further multiple sessions may be established between the source device and the destination device. A router or other network device processes the packets associated with each network traffic flow or session as the packets move between the source and destination devices. In order to process the packets, the network device assigns particular resources of the network device as being responsible for the processing of the packets. For example, a router may assign a particular line card to process the packets received from a network traffic flow. As the number of network traffic flows and sessions being handled by the network device increases, the amount of resources of the network device required to process the network traffic flows and sessions also increases. Further, as the number of packets being exchanged between the source and destination devices within each network traffic flow and/or session increases, the amount of resources of the network device required to process the packets also increases.

SUMMARY

In general, this disclosure is directed to techniques for predictive load balancing of network traffic flows and sessions across resources of a network device. Each network traffic flow and session is associated with a subscriber. In one example, the network device assigns different subscribers associated with the network traffic flows and sessions to different resources of the network device for processing the network traffic flows and session based at least in part on the amount of bandwidth and number of sessions each subscriber is predicted to use. The network device may pre-assign the subscribers with the heaviest predicted usage (e.g., the subscribers that are in the top five percent or the top ten percent by predicted usage) to particular resources within the network device to load balance those subscribers across the network device resources. In some examples, the network device may program a packet forwarding engine to cause the packets associated with the heaviest subscribers to be directed to the network resources assigned to process packets received from those subscribers.

Flows for the other subscribers (i.e., those subscribers that are not the heaviest users) may be dynamically assigned across the network device resources based on packet characteristics (e.g., a source address, destination address, subscriber identifier, etc.), the results of applying hashing algorithm to one or more packet characteristics, or other mechanism. For example, upon receiving an initial packet of a packet flow, the network device may apply a hash function to a particular packet characteristic to generate an index value. The network device may direct the packet to a particular network resource based on the generated index value. That is, the network device may dynamically direct packets associated with subscribers with lower predicted bandwidth and session usages to particular resources of the network device without pre-assigning the flows to the resources as with the subscribers having the higher predicted usage.

In one example, a method includes receiving, with a network device, an initial packet of a packet flow from a subscriber, performing, with the network device, a lookup in a routing table of the network device based at least in part on a subscriber identifier associated with the initial packet to generate a lookup result, wherein the subscriber identifier uniquely identifies the subscriber, and determining whether a first computing resource of a plurality of computing resources of the network device is pre-assigned to process the initial packet based at least in part on the lookup result. The method further includes, when the first computing resource is pre-assigned to process the initial packet, directing, with the network device, the initial packet to the first computing resource. The method further includes, when the first computing resource is not pre-assigned to process the initial packet: dynamically identifying a second computing resource of the plurality of computing resources to process the initial packet based at least in part on header information of the initial packet, and directing the initial packet to the second computing resource.

In another example, a network device includes a plurality of line cards to send and receive packets associated with a plurality of subscribers, a routing engine, a packet forwarding engine, and a routing table. A first line card of the plurality of line cards receives an initial packet of a packet flow from a first subscriber of the plurality of subscribers. The routing engine includes a load balance module configured to perform a lookup in the routing table based at least in part on a subscriber identifier associated with the initial packet to generate a lookup result, wherein the subscriber identifier uniquely identifies the subscriber, determine whether one of the plurality of line cards is pre-assigned to process the initial packet based at least in part on the lookup result. The packet forwarding engine is configured to, when one of the plurality of line cards is pre-assigned to process the initial packet, direct the initial packet to the pre-assigned line card, and, when one of the plurality of line cards is not pre-assigned to process the initial packet, 1) dynamically identify one of the plurality of line cards to process the initial packet based at least in part on header information of the initial packet, and 2) direct the initial packet to the dynamically identified one of the plurality of line cards.

In another example, a computer-readable storage medium is encoded with instructions for causing one or more programmable processors of a network device to receive an initial packet of a packet flow from a subscriber, perform a lookup in a routing table of the network device based at least in part on a subscriber identifier that uniquely identifies the subscriber to generate a lookup result, and determine whether a first computing resource of a plurality of computing resources of the network device is pre-assigned to process the initial packet based at least in part on the lookup result. The instructions further cause the one or more programmable processors to, when the first computing resource is pre-assigned to process the initial packet, direct the initial packet to the first computing resource, and, when the first computing resource is not pre-assigned to process the initial packet: dynamically identify a second computing resource of the plurality of computing resources to process the initial packet based at least in part on header information of the initial packet, and direct the initial packet to the second computing resource.

Techniques of this disclosure may provide one or more advantages. For example, techniques of this disclosure may enable a network device to load balance packet processing across resources of the network device by at least dynamically pre-assigning flows for those subscribers having the heaviest predicted usage to particular resources of the network device and dynamically directing packets associated with the remaining subscribers across these resources. Pre-assigning highly demanding subscribers to specific forwarding resources within the network device (e.g., line cards) reduces the change of overloading some resources while under utilizing others. Further, by only programming the packet forwarding engine to direct packets associated with the heaviest subscribers and dynamically directing packets associated with the other subscribers, fewer entries may need to be programmed in lookup component. As such, the hybrid predictive load balancing techniques described herein may more readily scale to environments with millions of subscribers.

The details of one or more embodiments are set forth in the accompanying drawings and the description below. Other features, objects, and advantages will be apparent from the description and drawings, and from the claims.

DETAILED DESCRIPTION

Figure 1:
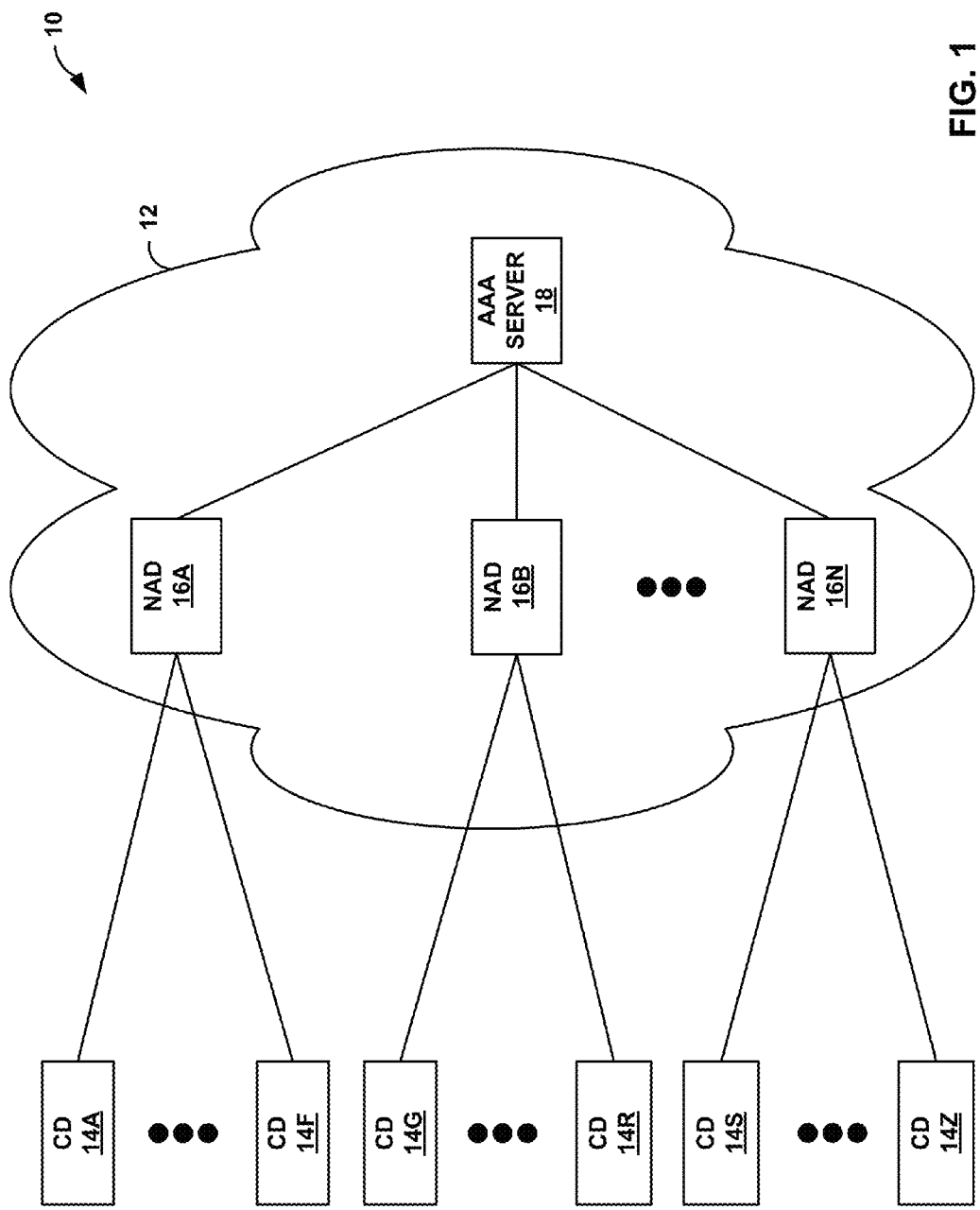
FIG. 1 is a block diagram illustrating an example network system that implements the network services load balancing techniques described in this disclosure.

FIG. 1 is a block diagram illustrating an example network system 10 that implements the network services load balancing techniques described in this disclosure. Example network system 10 is one example embodiment of a network system that may implement techniques of this disclosure. Other embodiments of a network system may also implement techniques of this disclosure, including the example network system described below with respect to FIG. 6.

In the example of FIG. 1, network system 10 includes service provider network 12 and customer devices 14A-N (collectively, "customer devices 14"). Service provider network 12 represents a network that provides one or more services to which customers may subscribe. Service provider network 12 may provide a number of different services, including a telephone service provided either by way of a plain old telephone system (POTS) network or a voice over Internet Protocol (VoIP) service by way of a layer three (L3) or packet-switched network, a television service provided by way of a dedicated coaxial cable network or as a streaming Internet Protocol television (IPTV) service over a L3 packet-switched network and/or a data or Internet service. Reference to layers followed by a number in this disclosure refers to corresponding layers of an Open Systems Interconnection (OSI) model.

Customer devices 14 may reside within customer networks and may include one or more computers, laptops, cellular phones (including so-called "smart phones"), tablet or slate computers, televisions (including so-called "smart TVs" capable of accessing various portions of a public network, such as the Internet), set-top boxes, personal gaming devices, personal media devices, telephones, switches, hubs, routers, wireless access points (WAPs), servers, or any other type of device generally available to customers that may access or otherwise interface with a customer network or service provider network 10. In addition, customer devices 14 may also include other network devices that may facilitate the transfer of data between these customer devices and/or service provider network 12, such as digital subscriber line (DSL) modems and cable modems, which may be generally referred to as "customer access devices."

As shown in the example of FIG. 1, service provider network 12 includes an authentication device in the exemplary form of an authentication, authorization and accounting (AAA) server 18. AAA server 18 provides AAA services in accordance with AAA protocols. Other types of AAA protocols include a remote authentication dial-in user subscriber (RADIUS) protocol specified in Request for Comments (RFC) 2865, entitled "Remote Authentication Dial In User Server (RADIUS)," which is hereby incorporated by reference as if set forth in its entirety, the Diameter protocol, or any other AAA protocol.

Upon initially connecting to service provider network 12, one of customer devices 14, such as customer device 14A, authenticates with the service provider in accordance with, in this example, the RADIUS protocol. Assuming successful authentication, network access device (NAD) 16A may associate the subscriber with a customer virtual local area network (C-VLAN) tag identifying the one of a C-VLAN (where a VLAN may generally represent a logical connection) and/or multicast VLAN (M-VLAN) configured for the customer access device that initiated the RADIUS protocol session. In addition, NAD 16A may determine a MAC address associated with the customer access device that initiated the RADIUS protocol session and associate this MAC address with the subscriber. NAD 16A may therefore maintain an association between MAC addresses of the customer access devices, C-VLAN tag and/or M-VLAN tag, and service VLAN (S-VLAN) tag. In this manner, NADs 16 may each associate the subscriber with the one or more connections between the customer access device and service provider network 12.

In some examples, one or more of NADs 16 may be a gateway device that, for example, provides network services to for mobile subscribers. One example implementation of a mobile gateway device is described by U.S. patent application Ser. No. 13/172,556, entitled "Mobile Gateway Having Decentralized Control Plane for Anchoring Subscriber Sessions," by Mehta et al., filed Jun. 29, 2011, which is hereby incorporated by reference in its entirety.

NADs 16, using the association between the subscriber and the connection between the customer access device and service provider network 12, may assign traffic for each subscriber to a particular hardware element of NAD 16 for processing based on a predicted load of each subscriber. For example, NAD 16A may be configured to process all network traffic associated with customer device 14A with a specific line card installed within NAD 16A and be configured to process all network traffic associated with customer device 14F with a different line card installed within NAD 16A. Typically, the traffic associated with each subscriber is distributed across various line cards (e.g., based on the total number of subscribers assigned to each line card). However, each subscriber may generate a different amount of network traffic (e.g., use a different amount of bandwidth and/or create a different number of concurrent sessions). Thus, when subscribers are assigned to the line cards of NAD 16A based on the number of subscribers already assigned to each line card, some line cards may have a very high workload while other line cards have a relatively low work load.

NAD 16A may aggregate statistical information about the packets traveling across the connection. For example, each of NADs 16 may aggregate information about the average number of concurrent sessions and the average amount of bandwidth used per second for each subscriber over a configurable period of time. In some examples, the aggregated information may be stored within each NAD 16. In other examples, each NAD 16 may send the statistical information to AAA server 18, which then further aggregates the information received from each of NADs 16 (e.g., where one subscriber sends packets to service provider network 12 using two or more different NADs 16). When AAA server 18 collects the statistical information from more than one NAD 16, each of NADs 16 may request the cumulative statistical information from AAA server 18 at a configurable interval (e.g., every five minutes).

NADs 16 may utilize the aggregated network traffic information collected for each subscriber to predict the future load of each subscriber and better assign the processing of network traffic for each subscriber across various hardware elements (e.g., line cards) of each NAD 16. In some embodiments, one of NADs 16 (e.g., NAD 16A) identifies the subscribers that have had the highest number of concurrent sessions and the highest bandwidth utilization (e.g., the top one percent, the top five percent, the top twenty percent, etc.) using the aggregated network traffic information. NAD 16A uses the past network traffic usage information for each subscriber as a prediction of future network traffic usage and load for each subscriber. NAD 16A then assigns the processing of the network traffic associated with the identified subscribers across the line cards of NAD 16A so as to balance the number of subscribers processed by each line card across the line cards. When assigning specific line cards to process the network traffic associated with the subscribers using the most bandwidth and/or the most concurrent sessions, NAD 16A may configure a forwarding element of NAD 16A to store the forwarding information the directs the network traffic of each identified subscriber to the appropriate line card. However, the amount of information that may be configured in the forwarding element is limited. Thus, the number of subscribers that may be assigned a particular line card based on the network traffic information is limited.

In some examples, NAD 16A may dynamically assign the processing of the network traffic associated with each of the remaining subscribers (e.g., those not identified as having the highest number of concurrent session or the highest bandwidth utilization) by hashing a packet characteristic and directing each packet to the line card associated with the result generated by the hashing algorithm or another mechanism so as to reduce the number of subscribers that need to be statically configured in the forwarding element. NAD 16A may associate a packet with a line card by applying a hash function to a portion of the routing information of the packet, referred to as a "key", to generate a hash value corresponding to the subscriber associated with the packet. The key of the packet may include routing information such as the source and destination IP address.

The hash function generates a range of hash values, and each packet when hashed corresponds to exactly one of the hash values. The granularity of the hash directly correlates with the amount of routing information included in the key. For example, a hash on a key that includes a source and destination IP address will be more granular than a hash on a key that includes a source IP address only. The key may further include additional routing information such as the protocol type, the source and destination port, the type of service (ToS), S-VLAN tag, C-VLAN tag, or M-VLAN tag associated with the subscriber, as well as any other routing information that remains constant for any one flow of data from source to destination. For packets conforming to protocols such as ATM and MPLS, the key may include routing information such as the asynchronous transfer mode (ATM) Virtual Channel Identifier (VCI), Virtual Path Identifier (VPI), the MPLS labels, as well as other fields such as higher-level MPLS labels or fields in an IP header, which may be encapsulated in an MPLS header.

NAD 16A maintains a distribution mapping for distributing traffic across the line cards of NAD 16A. As NAD 16A receives packets, NAD 16A associates the packets with a particular subscriber, and distributes the packets for the subscriber in accordance with the map. In general, the distribution mapping maintained by each of NADs 16 associates each of the possible hash values with a particular one of the line cards of the respective NAD 16. For example, the distribution mapping may comprise a hash map that associates the possible hash values with a set of pointers, and relay information that defines a set of forwarding elements and is addressable via the set of pointers. For distributing packets across internal data paths of a network device, e.g., within NAD 16A, the forwarding elements defined by the relay information may represent internal interconnects, e.g., internal forwarding engines that forward packets between input interfaces and output interfaces.

In this manner, each of NADs 16 may associate packets and subscribers, identify the subscribers responsible for a significant amount of bandwidth usage and for a significant number of concurrent sessions, and load balance the processing of the network traffic across various resources of each NAD 16 by statically assigning a resource to process the network traffic for each identified subscriber and dynamically assigning a resource to process the network traffic for each of the other subscribers. By statically assigning the heaviest users to particular resources and dynamically distributing the remaining subscribers, the subscribers may be more effectively load balanced across the resources of network device 16A while potentially minimizing the amount of information needed to be stored by a forwarding element of NAD 16A. Thus, techniques of this disclosure may better balance the processing of network traffic within NAD 16A.

Figure 2:
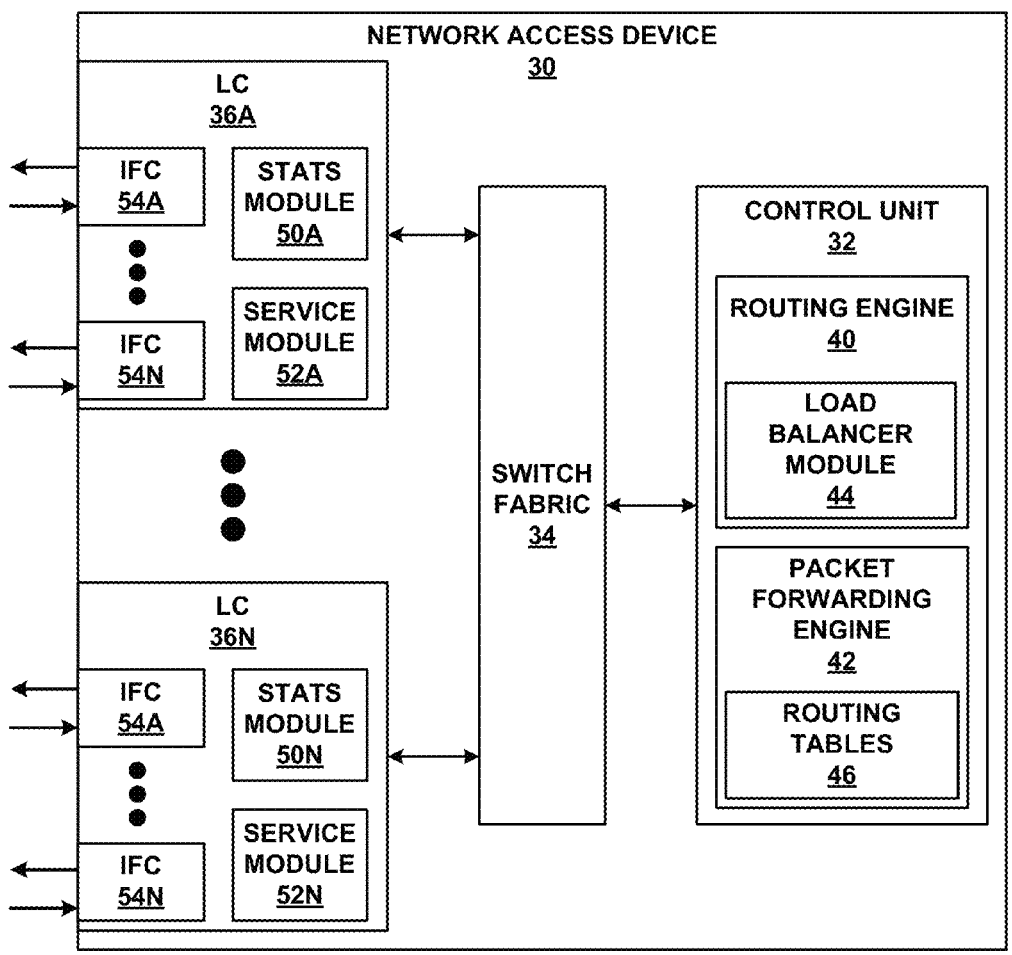
FIG. 2 is a block diagram illustrating an example network device that implements various aspects of the network services load balancing techniques described in this disclosure.

FIG. 2 is a block diagram illustrating an example network device that implements various aspects of the network services load balancing techniques described in this disclosure. Network access device (NAD) 30 includes a control unit 32, switch fabric 34, and line cards (LCs) 36A-36N (collectively, "line cards 36"). NAD 30 may represent any one of NADs 16 of FIG. 1.

Control unit 32 may represent one or more processors (not shown in FIG. 2) that execute software instructions, such as those used to define a software or computer program, stored to a computer-readable storage medium (not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. In this respect, the computer-readable storage medium may comprise a non-transitory computer-readable medium. Alternatively, control unit 32 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch fabric 34 provides a high-speed interconnect for forwarding incoming data packets to the correct one of LCs 36 for transmission over a network, such as service provider network 12, using an associated packet forwarding engine (PFE) 34 and a plurality of interface cards (IFCs) 54A-54N ("IFCs 54"). IFCs 54 may each represent an interface or port between a communication link and NAD 30 by which NAD 30 sends and receives data packets. LCs 36 send and receive data packets between LCs 36 via an internal communication link, such as an internal high-speed Ethernet connection. In some examples, LCs 36 may send and receive data packets between LCs 36 using switch fabric 34.

As shown in FIG. 2, control unit 32 includes routing engine 40 and packet forwarding engine 42. Routing engine 40 is responsible for maintaining network topology information, such as routing tables, executing routing protocols to communicate with peer routing devices to update the routing tables, and providing a management interface to allow user access and configuration of NAD 30. Packet forwarding engine 42 performs forwarding functions of NAD 30, such as packet validation, route lookup, and delivery.

Each of line cards 36A-N includes a plurality of IFCs 54, a respective statistics (STATS) module 50A-50N, and a respective service module 52A-52N. As network traffic passes through NAD 30 (e.g., via line cards 36), each respective statistics module 50 collects statistical information about the network traffic and aggregates the information for each subscriber. The network traffic sent and received by NAD 30 includes information that identifies each subscriber associated with the network traffic. For example, the network traffic may include packets having header information that may be extracted and associated with a particular subscriber. As another example, the network traffic may be sent and received using a particular ATM channel that is associated with a particular subscriber. In another example, the network traffic may be sent and received using a V-LAN that is associated with a particular subscriber. In each of these examples, statistics module 50 may monitor the incoming and outgoing network traffic and determine a number of sessions associated with each subscriber as well as an amount of network bandwidth used by each subscriber. Typically, the number of sessions for each subscriber is an average number of sessions used by the subscriber over a configurable period of time. Similarly, the amount of bandwidth used for each subscriber is typically an average amount of bandwidth used by the subscriber over a configurable period of time.

Each statistics module 50 periodically sends the collected information to load balancer module 44 of routing engine 40. Load balancer module 44 may further aggregate the statistical information received from all of statistics modules 50 based on a subscriber identifier. In this way, if a subscriber is generating network traffic that is being sent and received by multiple line cards 36, load balance module 44 may generate a more complete snapshot of the network traffic generated by the subscriber. Load balancer module 44 determines which subscribers are using the most bandwidth and/or sessions as a proxy for determining which subscribers are generating the most load on NAD 30 (i.e., utilizing the most computing resources of NAD 30).

In some examples, load balancer module 44 identifies the subscribers using an amount of bandwidth and/or generating an average number of sessions that is in the top five, ten, or twenty percent of subscribers that send network traffic through NAD 30. That is, load balancer module 44 may identify a portion of the subscribers that generate an average number of sessions that exceeds a threshold average number of sessions and/or use an average amount of bandwidth that exceeds a threshold average amount of bandwidth. The threshold average number of sessions may be an absolute average number of sessions (e.g., twenty sessions, thirty sessions, etc.) or a relative average number of sessions determined based on the average number of sessions generated by each subscriber (e.g., an average number of sessions that is greater than ninety-five percent of the average number of sessions generated by each subscriber). Similarly, the threshold average amount of bandwidth usage may be an absolute average amount of bandwidth or a relative amount of bandwidth determined relative to the average amount of bandwidth used by each of the subscribers.

Routing engine 40 pre-programs routing tables 46 within a forwarding component (e.g., a lookup processor) of packet forwarding engine 42 based on the subscribers identified by load balancer module 44 as generating the most load. The subscribers identified as generating the most load are predicted to generate the most load in the future. Routing tables 46 include at least forwarding information for a plurality of subscribers that send and receive network traffic using NAD 30. Each route stored in routing tables 46 typically associates a subscriber identifier to one of line cards 36 and/or one of interface cards 54 (e.g., by specifying a next hop for the packet). Typically, routing tables 46 may store a limited amount of information. For example, routing tables 46 may be limited to storing entries associated with 64K subscribers. In some examples, routing tables 46 are hardware filters configured by routing engine 40. The filters indicate particular actions to be performed when a packet is received that matches one of the filters (e.g., direct the packet to a particular one of line cards 36).

When configuring routing tables 46, routing engine 40 stores an association between a subscriber identifier for an identified subscribers and a line card 36. Load balancer module 44 may determine which of the identified subscribers should be assigned to which particular one of line cards 36 based on the amount of load generated by each of the identified subscribers. For example, load balancer module 44 may order the identified subscribers based on the amount of load each subscriber previously generated, assign the subscriber that generated the greatest amount of load to line card 36A, and assign the subscriber that generated the Nth most amount of load to line card 36N. Load balancer module 44 may then snake back through the line cards such that the subscriber that generated the N+1th most load is also assigned to line card 36N while the subscriber that generated the N+Nth most load is assigned to line card 36A. This is one example algorithm that may be used by load balancer module 44 to distribute the predicted future load generated by the identified subscribers across line cards 36 based on the previous load generated by each subscriber. Other algorithms that are known in the art may also be used by load balancer module 44 to assign subscribers to line cards 36 based on the amount of load generated by each subscriber. In general, load balancer module 44 assigns the identified subscribers to two or more of line cards 36 under the condition that the expected average total number of sessions and bandwidth per line card will be less than the session and bandwidth capacity of the respective line card.

Subscribers that are not identified by load balancer module 44 as having generated the most load on NAD 30 and, thus, not predicted to generate the most load on NAD 30 may not be statically assigned to a particular one of line cards 36. That is, routing engine 40 may not store forwarding information in routing tables 46 for the subscribers that are not predicted to generate an amount of network traffic that exceeds a threshold value. Instead, in various instances, packet forwarding engine 42 attempts to balance the load generated by the other subscribers (i.e., the subscribers not identified by load balancer module 44 as generating the most load) by dynamically assigning a line card based on the result of a hashing algorithm. Packet forwarding engine 42 may apply a hash function to information extracted from received network traffic (e.g., received packets) to generate a result that corresponds to one of line cards 36. The extracted information may include a five-tuple, a three-tuple, a V-LAN tag, an M-LAN tag, a C-LAN tag, a source and/or destination media access control (MAC) address, or other information from the received packet. A five-tuple typically includes a source IP address of the originating device, a destination IP address, a source port, a destination port, and a protocol identifier. A three-tuple typically includes a source IP address of the originating device, a destination IP address, and an Internet control message protocol (ICMP) identifier.

While packet forwarding engine 42 is described in the example above as using statistical information collected by statistics module 50 for identifying the subscribers that generate the most load on NAD 30, in other examples, packet forwarding engine 42 may use statistical information collected by an AAA server (e.g., AAA server 18 of FIG. 1) from a plurality of different network access devices (e.g., NADs 16 of FIG. 1). In one example, NAD 30 is one of a group of network access devices that are configured as a virtual chassis. That is, the network access devices are configured to process network traffic in the same way. In this example, the subscribers identified as generating the most load across all of the network access devices in the group are statically configured such that routing information for these subscribers is stored in routing tables 46.

In another example, NAD 30 is one of a group of network access devices that are configured as a cluster of network access devices. In this example, each of the network access devices may be programmed differently such that NAD 30 may store routing information in routing tables 46 that may be different than the routing information stored in a routing table of another network access device of the cluster of network access devices. That is, load balancer module 44 may identify the subscribers that generate the greatest amount of load based on the statistical information received from the AAA server, but routing engine 40 may only configure routing information in routing tables 46 for the subscribers that send and receive network traffic using NAD 30. In this manner, NAD 30 may program routing tables 46 differently than other network access devices in the cluster.

When NAD 30 receives a packet (e.g., via one of line cards 36), the packet is passed to packet forwarding engine 42 via switch fabric 34. Packet forwarding engine 42 determines which one of line cards 36 is assigned to process the packet. In one example, packet forwarding engine 42 first performs a lookup in routing tables 46 based on a subscriber identifier associated with the packet. In examples where the lookup returns a match (i.e., returns an indication of a line card or interface card of NAD 30), packet forwarding engine 42 passes the packet to the identified line card via switch fabric 34. In examples where the lookup does not return a match, packet forwarding engine 42 applies a hash function to information extracted from the packet (e.g., a three-tuple or five-tuple). The result of the hash function correspond to one of line cards 36 and packet forwarding engine 42 forwards the packet to the one of line cards 36 identified by the result.

In another example, packet forwarding engine 42 performs a lookup in routing tables 46 and applies a hash function to a packet characteristic in parallel. If the lookup returns a match, packet forwarding engine discards the result generated by applying the hash function and passes the packet to the line card identified by the lookup. If the lookup does not return a match, packet forwarding engine 42 directs the packet to the line card identified by the result of the hash function.

In either example, when the packet is passed to one of line cards 36 (e.g., line card 36A), line card 36A may perform additional process on the packet prior to forwarding the packet via one of IFCs 54. For example, the packet may require one or more services (e.g., quality of service, caching, content delivery network, security, flow blocking, anti-virus (AV) scanning and detection, intrusion detection protection (IDP), network address translation (NAT), firewall services, etc.) to be applied to the packet prior to forwarding. Service module 52A applies the one or more services and then directs the packet to the appropriate one of IFCs 54 for forwarding to a next hop.

Figure 3:
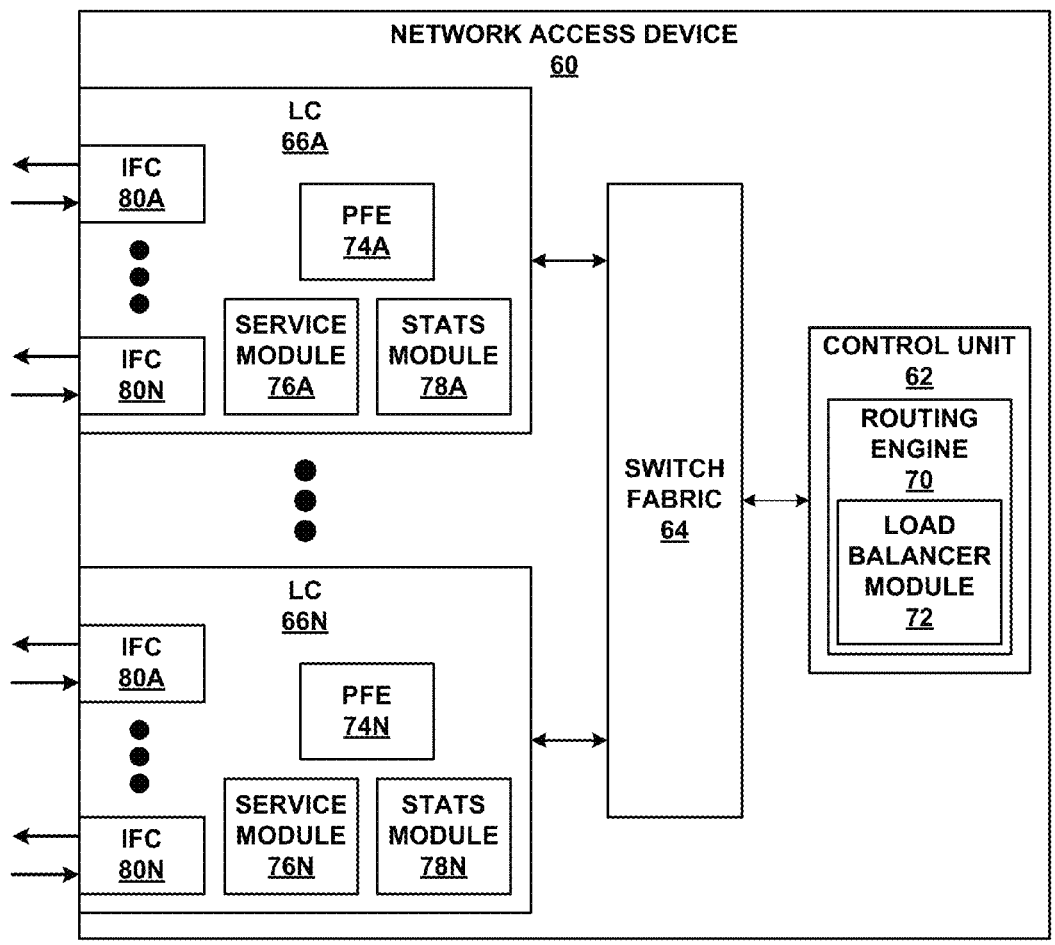
FIG. 3 is a block diagram illustrating another example network device that implements various aspects of the network services load balancing techniques described in this disclosure.

FIG. 3 is a block diagram illustrating another example network device that implements various aspects of the network services load balancing techniques described in this disclosure. NAD 60 includes a control unit 62, switch fabric 64, and line cards (LCs) 66A-66N (collectively, "line cards 66"). NAD 60 may represent any one of NADs 16 of FIG. 1. NAD 60 may be substantially similar to NAD 30 except that NAD 60 includes a respective one of packet forwarding engines (PFEs) 74A-74N (collectively, "packet forwarding engines 74") within each of line cards 66.

As shown in FIG. 3, control unit 62 includes routing engine 70 that is responsible for maintaining network topology information, such as routing tables, executing routing protocols to communicate with peer routing devices to update the routing tables, and providing a management interface to allow user access and configuration of NAD 60. Routing engine 70 also configures packet forwarding engines 74 in accordance with techniques of this disclosure.

Each of line cards 66 includes a respective group of interface cards (IFCs) 80A-80N (collectively, "IFCs 80"), and a respective one of packet forwarding engines 74, service modules 76A-76N, and statistics (STATS) modules 78A-78N. Each packet forwarding engine 74 performs forwarding functions of NAD 60, such as packet validation, route lookup, and delivery. Service modules 76 may apply one or more services to each packet processed by line cards 66. Each statistics module 78 collects statistical information about network traffic that is processed by a respective line card 66. The statistical information may include an average bandwidth usage and an average number of sessions for each subscriber over a configurable period of time.

Routing engine 70 includes load balancer module 72 that aggregates the statistical information collected by statistics modules 78 on a per subscriber basis. That is, load balancer module 70 collects statistical information from each of statistics modules 78 and aggregates the information based on a subscriber identifier associated with the network traffic. Using the aggregated statistical information, load balance module 70 identifies the subscribers that generate the most load on NAD 60 (e.g., the users that, on average, use the most bandwidth or generate the most sessions) and programs each of packet forwarding engines 74 to assign each subscriber to a particular one of line cards 66. The term "most" refers to an amount that exceeds a threshold value, such as the top five percent, top ten percent, etc. That is, a subscriber may be considered to be included within the subscribers that generate the most load on NAD 60 when, for example, the average amount of bandwidth used by the subscriber or the average number of sessions used by the subscriber is within the top five percent of all subscribers.

In one example, each of PFEs 74 is programmed with routes for the same set of subscribers (i.e., the subscribers identified as generating the most load). In this example, when line card 66A receives a packet via one of IFCs 80, packet forwarding engine 74A determines which one of line cards 66 is assigned to process the received packet. Packet forwarding engine 74 may apply a hash function to information extracted from a header of the packet (e.g., to a five-tuple or a three-tuple of the packet) and perform a lookup in a forwarding table of packet forwarding engine 74A using a subscriber identifier associated with the packet. In examples where the lookup does not return a match, packet forwarding engine identifies the one of line cards 66 associated with the result generated by applying the hash function. If the lookup returns a match, packet forwarding engine 74A discards the result generated by applying the hash function and, instead, directs the packet to the one of line cards 66 specified by the match.

In some examples, the result of the hash function and/or the lookup indicates that line card 66A is assigned to process the packet for the subscriber. In these examples, packet forwarding engine 74A determines if any services need to be applied to the packet and directs the packet to service module 76A for servicing, if needed, prior to forwarding the packet via one of IFCs 80. In other examples, the result of the hash function and/or the lookup indicates that one of line cards 66 other than line card 66A is assigned to process the packet. In these examples, packet forwarding engine 74A directs the packet to the appropriate one of line cards 66 via switch fabric 64.

In some embodiments, routing engine 70 may program each of packet forwarding engines 74 differently. For example, routing engine 70 may program each of packet forwarding engines 74 with subscriber information for the subscribers that generate the most load for each respective line card 66. In other words, load balancer module 72 may identifier the subscribers that generate the most load within each of line cards 66 and routing engine 70 may program packet each forwarding engine 74 with forwarding information for the heaviest using subscribers of the respective line card 66. In another example, each packet forwarding engine 74 may be programmed by routing engine 70 such that each subscriber may be assigned to a particular one of IFCs 80 within each line card 66.

Figure 4:
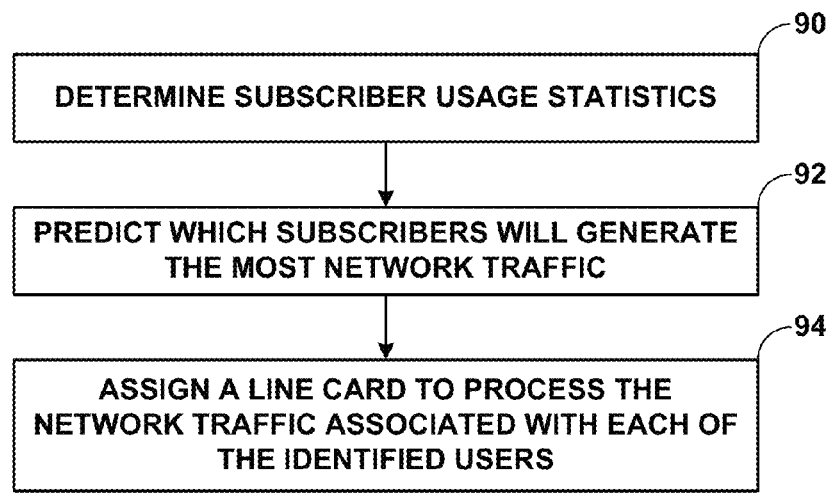
FIG. 4 is a flowchart illustrating an example operation of a network access device in implementing assignment of subscribers across resources of the network device aspects of the network service load balancing techniques described in this disclosure.

FIG. 4 is a flowchart illustrating an example operation of a network device in implementing assignment of subscribers across resources of the network device aspects of network service load balancing techniques described in this disclosure. For purposes of clarity, the example process shown in FIG. 4 will be described with respect to network system 10 of FIG. 1 and NAD 30 of FIG. 2. However, the example process illustrated in FIG. 4 should not be considered as being limited to the specific functional components illustrated in FIGS. 1 and 2.

As NAD 30 processes network traffic for customer devices 14, statistics modules 50 collect statistical information about the network traffic (90). The statistical information includes subscriber identifiers, an average amount of bandwidth used by each subscriber over a configurable period of time, and an average number of concurrent sessions used by each subscriber over a configured period of time. In examples where NAD 30 includes a plurality of line cards 36, load balancer module 44 may aggregate the statistical information generated by each statistic module 50 into cumulative statistical information for NAD 30.

In some embodiments, NAD 30 may be one of a plurality of network access devices that utilize an authentication server for authenticating subscribers prior to granting access to subscriber network 12 (e.g., network access device 16A communicatively coupled to AAA server 18 of FIG. 1). In these embodiments, each network access device may periodically send the statistical information to AAA server 18 (e.g., push the data to AAA server 18 at a configurable interface automatically or in response to receiving a request from AAA server 18 for the statistical information from each network access device). AAA server 18 may process the statistical information collected from all of the network access devices to generate combined statistical information for the network traffic processed by all or a subset of the network access devices (e.g., all or a subset of network access devices 16 of FIG. 1).

NAD 30 predicts which subscribers are going to generate the most network traffic by at least identifying a portion of the subscribers that used greater than a threshold amount of bandwidth and/or concurrent sessions based on the aggregated statistical information (92). In embodiments where AAA server 18 aggregates the statistical information, AAA server 18 may identify the subscribers that have greater than a threshold amount of usage across all of NADs 16. The threshold average number of sessions may be an pre-configured static average number of sessions (e.g., twenty sessions, thirty sessions, etc.) or a relative average number of sessions determined based on the average number of sessions generated by each subscriber (e.g., an average number of sessions that is greater than ninety-five percent of the average number of sessions generated by each subscriber). Similarly, the threshold average amount of bandwidth usage may be an absolute average amount of bandwidth or a relative amount of bandwidth determined relative to the average amount of bandwidth used by each of the subscribers.

NAD 30 assigns one of line cards 36 to process the network traffic associated with each of the identified users (94). For example, load balancer module 44 may order the identified subscribers based on the amount of load each subscriber generated, assign the subscriber that generated the greatest amount of load to a first one of line cards 36 and assign the subscriber that generated the 2nd most amount of load to a different one of line cards 36. Load balancer module 44 may continue to assign line cards for each subscriber based on the predicted amount of load associated with each subscriber in order to approximately distribute the historical load for each user across two or more of line cards 36. In order to cause received packets to be directed to the one of line cards 36 assigned to process network traffic of the subscriber associated with the received packet, routing engine 40 programs routing tables 46 with a subscriber identifier and a line card identifier.

In examples where AAA server 18 aggregates the statistical information across a plurality of network access devices, NAD 30 may received the aggregated statistical information and assign line cards 36 based on the aggregated information. When the plurality of network access devices are configured as a virtual chassis, AAA server 18 may assign subscriber to particular virtual line cards that correspond to physical line cards of each of the plurality of network devices. When the plurality of network devices are configured as a cluster, NAD 30 may identify the subscribers that are predicted to generate the most load based on the aggregated statistical information received from AAA server 18 and identify the one or more of those subscribers for which NAD 30 processes network traffic. NAD 30 may then assign one of line cards 36 to process the network traffic associated with the subscribers identified as being in the top five or ten percent of all subscribers by network usage and that send and/or receive network traffic using NAD 30.

Figure 5:
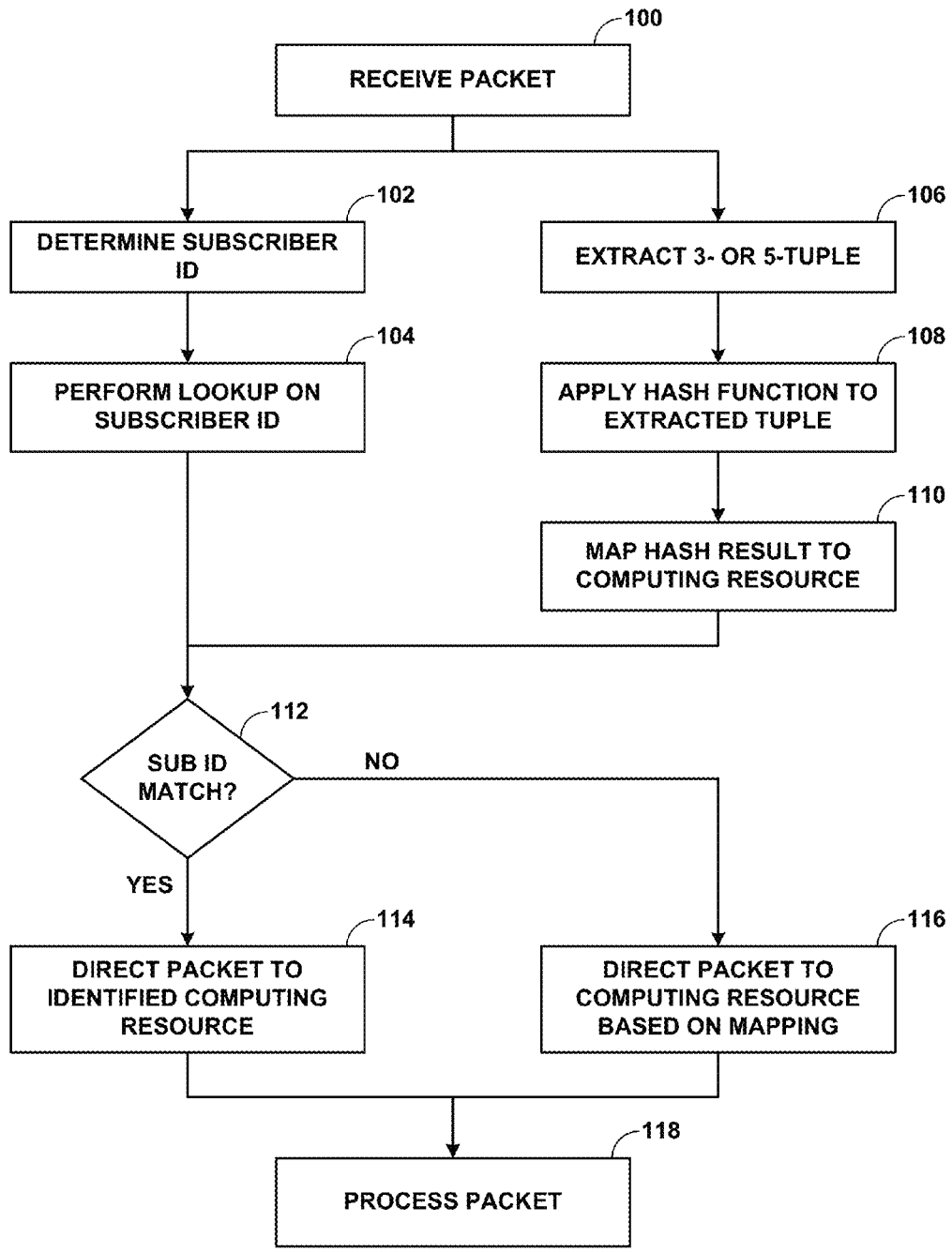
FIG. 5 is a flow chart illustrating an example operation of a network access device in implementing packet processing aspects of the network service load balancing techniques described in this disclosure.

FIG. 5 is a flow chart illustrating an example operation of a network device in implementing packet processing aspects of network service load balancing techniques described in this disclosure. For purposes of clarity, the example process shown in FIG. 5 will be described with respect to network system 10 of FIG. 1 and NAD 30 of FIG. 2. However, the example process illustrated in FIG. 5 should not be considered as being limited to the specific functional components illustrated in FIGS. 1 and 2.

NAD 30 receives a data unit from a subscriber device (e.g., one of customer devices 14) using one of IFCs 54 and line cards 36 (100). In some examples, the data unit is a packet received using a V-LAN, C-LAN, or M-LAN and includes a corresponding identifier that identifies the subscriber from which the packet is received. In other examples, the data unit is a data cell received using an ATM channel and includes a channel identifier that uniquely identifies the subscriber from which the data cell is received. NAD 30 passes the data unit to control unit 32 using switch fabric 34.

Packet forwarding engine 42 determines the subscriber identifier based on an identifier included in the data unit, such as the V-LAN identifier or ATM channel identifier (102) and performs a lookup on the subscriber identifier to determine if a route has been installed within routing tables 46 for the subscriber (104). A route may be installed within routing tables 46 when, for example, the subscriber associated with the subscriber identifier is one of the heavier users of the computing resources of NAD 30. For example, the subscriber may use, on average over a configurable period of time, a higher number of concurrent sessions and/or a higher amount of bandwidth. In various instances, the subscribers using an average number of concurrent sessions and/or an average amount of bandwidth that is greater than a threshold value are assigned particular resources (i.e., line cards and/or interfaces) of NAD 30 for processes. The threshold value may be a relative value (i.e., average number of concurrent sessions and/or average bandwidth usage greater than a certain percentage of other subscribers, such as five percent, ten percent, etc.) or an absolute value (i.e., average number of concurrent sessions and/or average bandwidth usage greater than a certain number of concurrent sessions or a certain amount of bandwidth usage). Typically, the subscribers whose usage exceeds the threshold are assigned across the computing resources of NAD 30 in such a manner as to approximately balance the load generated by these subscribers across the computing resources.

Whether or not the subscriber is assigned a particular computing resource and, thus, has a route installed in routes 36, packet forwarding engine 42 may also extract the 3-tuple or 5-tuple from the data unit (106) and apply a hash function to the extracted tuple (108) in order to determine the computing resource (i.e., the line card 36 and/or IFC 54) to which packet forwarding engine 42 should direct the data unit. Applying the hash function to the extract tuple generates an index value that maps to a computing resource of NAD 30 (110). The mapping, in various instances, is stored in routing tables 46. In some examples, packet forwarding engine 42 extracts the 3-tuple or 5-tuple from the data unit and applies the hash function to the extract tuple in parallel with determining the subscriber identifier and performing the lookup in routing tables 46 on the subscriber identifier. In other examples, packet forwarding engine 42 may first determine the subscriber identifier and perform the lookup on the subscriber identifier prior to extracting the tuple and applying the hash function to the tuple.

Packet forwarding engine 42 determines whether or not the subscriber identifier lookup in routing tables 46 returned a match (112). If the subscriber identifier lookup returned a match ("YES" branch of 112), packet forwarding engine 42 directs the data unit to the computing resource identified by the lookup result (114). If the subscriber identifier lookup does not return a match ("NO" branch of 112), packet forwarding engine directs the data unit to the computing resource identified by the hash result mapping (116). That is, whenever the subscriber lookup returns a result indicating a match (i.e., indicating that the subscriber was pre-assigned to a particular line card and/or interface), the result of the hashing function and corresponding mapping is discarded.

The appropriate one of line cards 36 of NAD 30 receives the data unit from packet forwarding engine 42 and processes the packet (118). The packet processing may include applying one or more services prior to forwarding the packet to the next-hop. For example, services module 52A may chain the application of the services to the data unit such that all of the services are applied to the data unit within line card 36A. After the appropriate services are applied to the data unit, the data unit is forwarded to the next hop using one of IFCs 54.

Figure 6:
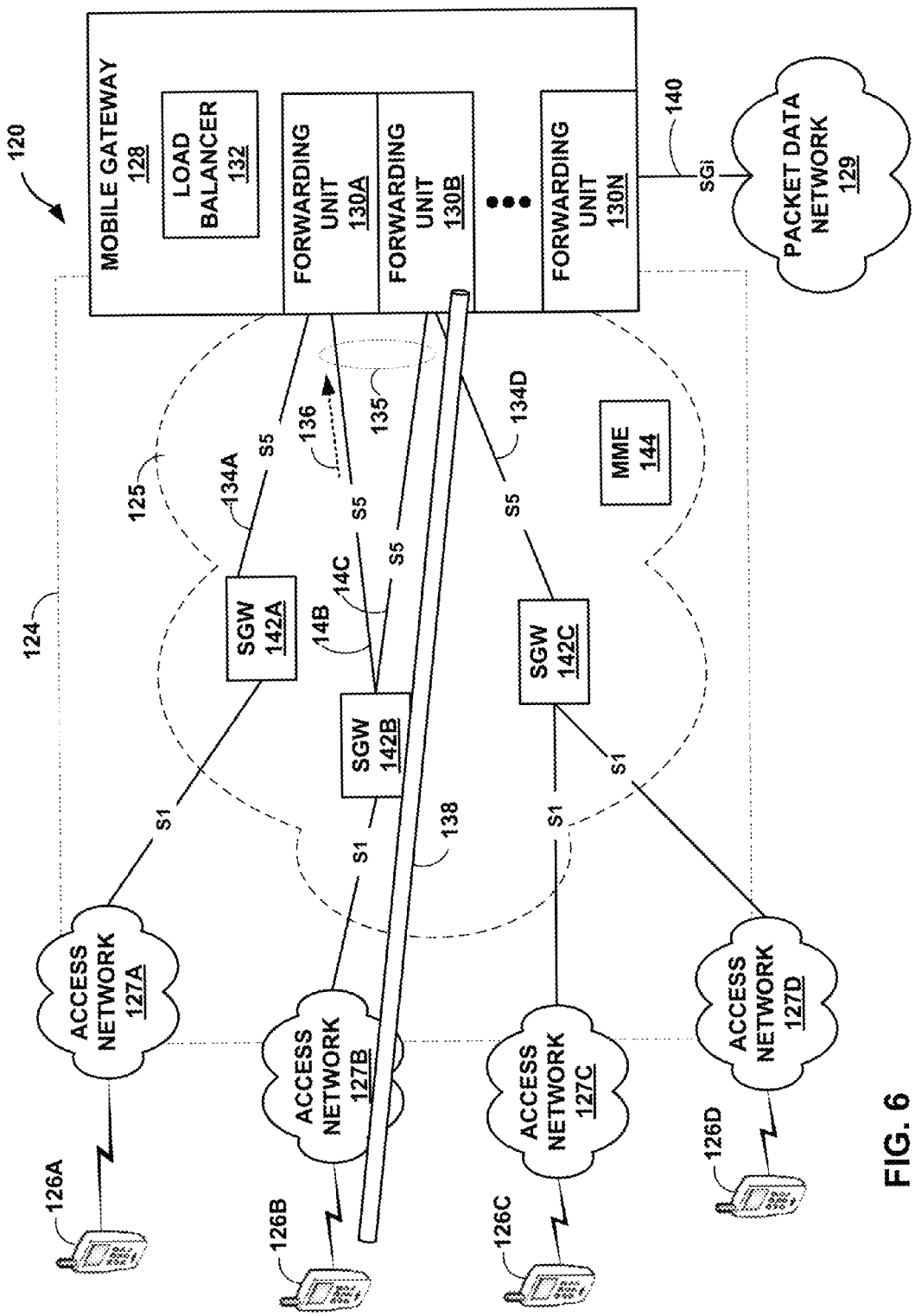
FIG. 6 is a block diagram illustrating an example mobile gateway that implements various aspects of the network services load balancing techniques described in this disclosure.

FIG. 6 is a block diagram illustrating an example network system that implements various aspects of the network services load balancing techniques described in this disclosure. In this example, network system 120 includes packet data network (PDN) 129 that exchanges traffic with mobile service provider network 124 ("SP network 124") using an SGi interface (or "reference point") with mobile gateway 128 operating over communication link 140. Packet data network 129 supports one or more packet-based services that are available for request and use by wireless devices 126A-126D ("wireless devices 126"). As examples, PDN 129 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 129 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates SP network 124, an enterprise IP network, or some combination thereof. In various embodiments, PDN 129 is connected to a public WAN, the Internet, or to other networks. Packet data network 129 executes one or more packet data protocols (PDPs), such as IP (IPv4 and/or IPv6), X.25 or Point-to-Point Protocol (PPP), to enable packet-based transport of PDN 129 services.

Each of wireless devices 126 is a wireless communication device for a subscriber (alternatively, a "subscriber device" or "mobile device") and may represent, for example, a mobile telephone, a laptop or desktop computer having, e.g., a 3G/4G wireless card, a wireless-capable netbook, a video game device, a pager, a smart phone, or a personal data assistant (PDA). Each of wireless devices 126 may run one or more applications, such as VoIP clients, video games, videoconferencing, E-mail, and Internet browsers, among others. Certain applications running on wireless device 126 may require access to services offered by PDN 12, such as Internet browsers that require access to the Internet. Wireless devices 126 may also be referred to, in various architectural embodiments, as User Equipment (UE) or Mobile Stations (MS) and may alternatively be referred to herein as mobile devices.

Mobile service provider network 124, in this example, is a Long Term Evolution (LTE) network that includes an Evolved Packet Core (EPC) network 125 ("core network 125") interfaced to access networks 127A-127D, which in this example each represent an Evolved UTRAN (E-UTRAN). SP network 124 enables and transports service data exchanged between wireless device 126 and PDN 129. While illustrated and described with respect to a particular mobile service provider network architecture (i.e., an LTE network), SP network 124 may represent any type of content access network that provides network access, data transport and other services to wireless devices 126 attached to SP network 124. In general, SP network 124 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GPP/2), an Internet Engineering Task Force (IETF) and a Worldwide Interoperability for Microwave Access (WiMAX) forum. For example, SP network 124 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Mobile service provider network 124 may, alternatively or in conjunction with one of the above, implement a Code Division Multiple Access-2000 ("CDMA2000") or Enhanced Data Rates for GSM Evolution (EDGE) architecture. Mobile service provider network 124 may, again as an alternative or in conjunction with one or more of the above, implement a WiMAX architecture defined by the WiMAX forum. Mobile service provider network 124 may be alternatively referred to herein as a content access network (CAN).

Mobile service provider network 124 provides mobility management, session management, and packet routing and transfer for network system 120. Mobile service provider network 124 establishes and operates bearers to transport user traffic, in the form of PDP packet data units (PDUs), referred to hereinafter as "packets." In general, a bearer is a set of network resources and data transport functions in SP network 124 to deliver user traffic between two network entities. A bearer may include a path, a logical connection, or a physical or wireless connection between two network devices. A bearer may include, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Core network 125 of SP network 124 includes mobile gateway 128 logically connected to each of Serving Gateways 142 via S5 interfaces (or "reference points") operating over respective communication links 134A-134D. Mobile gateway 128 is an edge router between mobile SP network 124 and external PDNs, e.g., PDN 129, and hosts packet filtering, lawful interception, PDP address allocation, among other functionality. As a router, mobile gateway 128 also executes routing protocols to identify routes through SP network 124 or PDN 129 to various destinations.

The S5 interface provides protocols to facilitate user plane tunneling and tunnel management between mobile gateway 128 and SGWs 142. The S5 interface may implement a user plane protocol stack that includes GPRS Tunneling Protocol-User Plane (GTP-U) executing over User Datagram Protocol/Internet Protocol (UDP/IP). The term "communication link," as used herein, includes any form of transport medium, wired or wireless, and can include intermediate nodes such as network devices. SGWs 142 host mobility anchoring, packet routing and forwarding, lawful interception, and other functionality.

Core network 125 additionally includes Mobility Management Entity (MME) 144 logically connected to SGWs 142 via S11 interfaces (not shown in FIG. 1 for ease of illustration purposes). The S11 interface provides protocols with which MME 144 establishes and manages bearers that traverse or terminate at SGWs 142. The S11 interface may implement a control plane protocol stack that includes GTP-Control Plane (GTP-C) executing over UDP/IP. In addition to bearer management and establishment, MME 144 hosts Non-Access Stratum (NAS) signaling, mobile gateway 128 and SGW 142 selection, roaming, and authentication, for instance. In various embodiments, core network 125 includes different numbers of MMEs, SGWs, and/or PGWs. In different architectures embodiments of SP network 124, such as a UTRAN network, Serving GPRS Serving Nodes (SGSNs) may perform the functionality of SGWs 142 and MME 144, and a Gateway GPRS Serving Node (GGSN) may perform functionality of mobile gateway 128 consistent with techniques of this disclosure. While described with respect to a particular type of LTE node, i.e., a PGW, the techniques are applicable to other types of core network gateways, including GGSNs, SGSNs, aGWs, and SGWs.

SGWs 142 and MME 144 connect to access networks 127 (e.g., U-TRANS) via respective aspects of an S1 interface. Specifically, SGWs 142 logically connect to individual access networks 127 via an S1-U interface operating over a communication link, and MME 144 logically connects to individual access networks 127 via an S1-MME interface operating over a communication link to establish bearers over the S1-U interface between SGWs 142 and access networks 127. Each of access networks 127 may be a radio access network, which in various instances may be a GSM Radio Access Network (GRAN), a WiMAX radio access network, a UMTS Terrestrial Radio Access Network (UTRAN), and/or an evolution of a UTRAN for LTE networks known as an E-UTRAN. Each of access networks 127 may include one or more radio towers, which in the case of E-UTRANs are eNode Bs and in the case of UMTS RANs are Node Bs. Wireless devices 126 communicatively couple to access networks 127 using a Uu interface operating over a radio link in this example.

Mobile service provider network 124 may further include a backhaul or transport network (not shown) that includes land-based transmission lines, frequently leased by a service provider, to transport user and control traffic between wireless devices 126 and mobile gateway 128. The backhaul network also includes network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the illustrated example, mobile gateway 128 represents a PDN Gateway (PGW). However, in various other architectural embodiments of SP network 124, mobile gateway 128 may represent, for example, a Gateway GPRS Serving Node (GGSN) or an Access Gateway (aGW). Mobile gateway 128 may present a uniform interface to downstream nodes, including SGWs 142 and MME 144, to allow the downstream nodes to address subscriber service and/or signaling traffic to the uniform interface rather than separately directing such traffic among multiple devices or multiple control plane entities (e.g., service cards) within a single device. In some instances, the uniform interface is an IP address or other network layer address of mobile gateway 128 that is shared among all control plane entities.

Mobile gateway 128 includes a decentralized data plane in that data plane functionality and packet forwarding functionality is distributed among a plurality of forwarding units 130A-130N ("forwarding units 130"). Each of forwarding units 130 connects to one or more instances of the various LTE interfaces. For example, forwarding unit 130B implements an S5 interface with SGW 142B and an S5 interface with SGW 142C. As another example, forwarding unit 130A implements an S5 interface with SGW 142A and an S5 interface with SGW 142B. Forwarding units 130N implements an SGi interface for exchanging subscriber data traffic with PDN 129.

Each of forwarding units 130 includes hardware or a combination of hardware and software that forward subscriber traffic, in accordance with forwarding information, from an inbound S5/SGi interface to an outbound S5/SGi interface. One or more physical interface cards (PICs) together with one or more packet processors reside on each of forwarding units 130, which are insertable within a mobile gateway 128 chassis. Each forwarding unit thus presents a network interface for sending and receiving subscriber traffic and also includes packet processing capabilities to enable subscriber data packet processing with respect to subscriber sessions to perform aspects of mobile gateway 128 functionality.

As network traffic passes through mobile gateway 128, mobile gateway 128 collects statistical information about the network traffic and aggregates the information for each subscriber by, for example, monitoring the incoming and outgoing network traffic and determine a number of sessions associated with each subscriber as well as an amount of network bandwidth used by each subscriber. Typically, the number of sessions for each subscriber is an average number of sessions used by the subscriber over a configurable period of time. Similarly, the amount of bandwidth used for each subscriber is typically an average amount of bandwidth used by the subscriber over a configurable period of time. Load balancer 132 may collect the statistical information and determine which subscribers are using the most bandwidth and/or sessions as a proxy for determining which subscribers are generating the most load on mobile gateway 128 (i.e., utilizing the most computing resources of mobile gateway 128).

In some examples, load balancer 132 identifies the subscribers using an amount of bandwidth and/or generating an average number of sessions that is in the top five, ten, or twenty percent of subscribers that send network traffic through mobile gateway 128. That is, load balancer 132 may identify a portion of the subscribers that generate an average number of sessions that exceeds a threshold average number of sessions and/or use an average amount of bandwidth that exceeds a threshold average amount of bandwidth. The threshold average number of sessions may be an absolute average number of sessions (e.g., twenty sessions, thirty sessions, etc.) or a relative average number of sessions determined based on the average number of sessions generated by each subscriber (e.g., an average number of sessions that is greater than ninety-five percent of the average number of sessions generated by each subscriber). Similarly, the threshold average amount of bandwidth usage may be an absolute average amount of bandwidth or a relative amount of bandwidth determined relative to the average amount of bandwidth used by each of the subscribers.

A routing engine of mobile gateway 128 pre-programs routing tables within a forwarding component (e.g., a lookup processor) of forwarding units 130 based on the subscribers identified by load balancer 132 as generating the most load. The subscribers identified as generating the most load are predicted to generate the most load in the future. Each route stored in the routing tables typically associates a subscriber identifier to one of forwarding units 130 (e.g., by specifying a next hop for the packet). Load balancer 132 may determine which of the identified subscribers should be assigned to which particular one of forwarding units 130 based on the amount of load generated by each of the identified subscribers. In general, load balancer 132 assigns the identified subscribers to two or more of forwarding units 130 under the condition that the expected average total number of sessions and bandwidth per line card will be less than the session and bandwidth capacity of the respective line card.

Subscribers that are not identified by load balancer 132 as having generated the most load on mobile gateway 128 and, thus, not predicted to generate the most load on mobile gateway 128 may not be statically assigned to a particular one of forwarding units 130. That is, a routing engine of mobile gateway 128 may not store forwarding information in routing tables of mobile gateway 128 for the subscribers that are not predicted to generate an amount of network traffic that exceeds a threshold value. Instead, in various instances, mobile gateway 128 attempts to balance the load generated by the other subscribers (i.e., the subscribers not identified by load balancer 132 as generating the most load) by dynamically assigning a line card based on the result of a hashing algorithm. Forwarding units 130 may apply a hash function to information extracted from received network traffic (e.g., received packets) to generate a result that corresponds to one of forwarding units 130. The extracted information may include a five-tuple, a three-tuple, a V-LAN tag, an M-LAN tag, a C-LAN tag, a source and/or destination media access control (MAC) address, or other information from the received packet. A five-tuple typically includes a source IP address of the originating device, a destination IP address, a source port, a destination port, and a protocol identifier. A three-tuple typically includes a source IP address of the originating device, a destination IP address, and an Internet control message protocol (ICMP) identifier.

When mobile gateway 128 receives a packet, mobile gateway 128 determines which one of forwarding units 130 is assigned to process the packet. In one example, the one of forwarding units that received the packet (e.g., forwarding unit 130A) first performs a lookup in routing tables based on a subscriber identifier associated with the packet. In examples where the lookup returns a match (i.e., returns an indication of one of forwarding units 130), passes the packet to the identified forwarding unit 130. In examples where the lookup does not return a match, forwarding unit 130A applies a hash function to information extracted from the packet (e.g., a three-tuple or five-tuple). The result of the hash function correspond to one of forwarding units 130 and forwarding unit 130A forwards the packet to the one of forwarding units 130 identified by the result.

In another example, forwarding unit 130A performs a lookup in routing tables and applies a hash function to a packet characteristic in parallel. If the lookup returns a match, forwarding unit 130A discards the result generated by applying the hash function and passes the packet to the forwarding unit identified by the lookup. If the lookup does not return a match, forwarding unit 130A directs the packet to the forwarding unit identified by the result of the hash function.

In either example, when the packet is passed to one of forwarding units 130 (e.g., forwarding unit 130A), forwarding unit 130A may perform additional process on the packet prior to forwarding the packet. For example, the packet may require one or more services (e.g., quality of service, caching, content delivery network, security, flow blocking, anti-virus (AV) scanning and detection, intrusion detection protection (IDP), network address translation (NAT), firewall services, etc.) to be applied to the packet prior to forwarding.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

What is claimed is:

1. A method comprising:
    selecting, with a network device and from a plurality of subscribers, a subset of the plurality of subscribers that each is associated with a respective predicted amount of future network traffic greater than a threshold amount of network traffic;
    pre-assigning, with the network device and prior to receiving initial packets for packet flows from the plurality of subscribers, each subscriber of the subset of subscribers to a corresponding one or more of a plurality of computing resources of the network device to process the packet flows from the subset of subscribers;
    receiving, with a network device, a packet flow from a subscriber of the plurality of subscribers;
    determining, by the network device, whether any of the plurality of computing resources of the network device is pre-assigned to process the packet flow from the subscriber;
    responsive to determining that a first computing resource of the plurality of computing resources is pre-assigned to process the packet flow from the subscriber, directing, with the network device, the packet flow to the first computing resource; and
    responsive to determining that none of the plurality of computing resources are pre-assigned to process the packet:
        dynamically identifying one of the plurality of computing resources to process the packet flow; and
        directing the packet flow to the one computing resource.

2. The method of claim 1, wherein selecting the subset of the plurality of subscribers comprises:
    receiving, with the network device, statistical information that specifies a respective amount of network traffic previously generated by each of the plurality of subscribers;
    predicting, based on the received statistical information, a respective amount of future network traffic associated with each subscriber of the plurality of subscribers; and
    identifying, with the network device, the subset of subscribers from the plurality of subscribers that are predicted to be associated with the respective amount of future network traffic greater than the threshold amount of network traffic.

3. The method of claim 2, wherein the respective amount of network traffic generated by each of the subscribers includes an average number of active sessions for the corresponding subscriber over a configurable period of time.

4. The method of claim 2, wherein the respective amount of network traffic generated by each of the subscribers includes an average amount of bandwidth used by the corresponding subscriber over a configurable period of time.

5. The method of claim 1, wherein pre-assigning each subscriber of the subset of subscribers to the corresponding one or more of the plurality of computing resources to process the packet flows from the subset of subscribers comprises:
  storing a computing resource identifier and a subscriber identifier in a routing table of the network device, wherein the computing resource identifier uniquely identifies the corresponding one of the one or more of the plurality of computing resources pre-assigned to process the packet flows for a respective one of the subset of subscribers, and wherein the subscriber identifier uniquely identifies the respective one of the subset of subscribers.

6. The method of claim 5, wherein the network device comprises a router, and wherein storing the computing resource identifier and the subscriber identifier in the routing table comprises programming the routing table prior to receiving an initial packet of the packet flow from the subscriber.

7. The method of claim 1, wherein dynamically identifying the one of the plurality of computing resources comprises:
  applying a hash function to at least a portion of header information included in an initial packet of the packet flow to generate a hash result; and
  mapping the hash result to the one of the plurality of computing resources based on a hash map of the network device.

8. The method of claim 7, wherein the lookup in the routing table and the application of the hash function are performed by the network device in parallel.

9. The method of claim 7, wherein the portion of the header information includes at least one of a subscriber identifier, a three-tuple, and a five-tuple.

10. The method of claim 1, further comprising:
  applying, with the first computing resource, one or more services to an initial packet of the packet flow;
  identifying, with the first computing resource, a next hop for the initial packet; and
  forwarding the initial packet to the next hop.

11. The method of claim 1, wherein each computing resource of the plurality of computing resources of the network device comprises at least one of a line card and a network interface.

12. A network device comprising:
  a plurality of line cards to send and receive packets associated with a plurality of subscribers;
  a routing engine; and
  a packet forwarding engine,
  wherein the routing engine comprises a load balancer module configured to select, from a plurality of subscribers, a subset of the plurality of subscribers that each is associated with a respective predicted amount of future network traffic greater than a threshold amount of network traffic, pre-assign, prior to receiving initial packets for packet flows from the plurality of subscribers, each subscriber of the subset of subscribers to a corresponding one or more of the plurality of line cards to process the packet flows from the subset of subscribers,
  wherein a first line card of the plurality of line cards receives a packet flow from a subscriber, wherein the subscriber is one of the plurality of subscribers,
  wherein the load balancer module is further configured to determine whether one of the plurality of line cards is pre-assigned to process the initial packet based at least in part on the lookup result, and
  wherein the packet forwarding engine is configured to, when any of the plurality of line cards is pre-assigned to process the packet flow from the subscriber, direct the packet flow to the pre-assigned line card, and, when none of the plurality of line cards are pre-assigned to process the packet flow, 1) dynamically identify one of the plurality of line cards to process the packet flow from the subscriber, and 2) direct the packet flow to the dynamically identified one of the plurality of line cards.

13. The network device of claim 12,
  wherein the load balancer module selects the subset of the plurality of subscribers by at least being configured to receive statistical information that specifies a respective amount of network traffic previously generated by each of the plurality of subscribers, predict, based on the received statistical information, a respective future amount of network traffic associated with each subscriber of the plurality of subscribers, and identify the subset of subscribers from the plurality of subscribers that are predicted to be associated with the respective amount of future network traffic greater than the threshold amount of network traffic.

14. The network device of claim 13, wherein the respective amount of network traffic generated by each of the plurality of subscribers includes at least one of an average number of active sessions for the corresponding subscriber over a configurable period of time and an average amount of bandwidth used by the corresponding subscriber over the configurable period of time.

15. The network device of claim 12, further comprising:
  a routing table,
  wherein the routing engine stores a line card identifier and a subscriber identifier in the routing table, wherein the line card identifier uniquely identifies the corresponding one of the one or more of the plurality of line cards pre-assigned to process the packet flows for a respective one of the subset of subscribers, and wherein the subscriber identifier uniquely identifies the respective one of the subset of subscribers.

16. The network device of claim 15,
  wherein the packet forwarding engine further comprises a lookup processor,
  wherein the routing table is located in the lookup processor, and
  wherein the routing engine stores the line card identifier and the subscriber identifies by at least being configured to preprogram the routing table of the lookup processor with the subscriber identifier and the line card identifier.

17. The network device of claim 12, further comprising:
  a routing table configured to store a hash map,
  wherein the packet forwarding engine is configure to dynamically identify one of the plurality of line cards to process the packet flow by at least being configured to apply a hash function to at least a portion of header information included in an initial packet of the packet flow to generate a hash result, and map the hash result to the dynamically identified line card based on the hash map.

18. The network device of claim 17, wherein the packet forwarding engine is configured to perform the lookup in the routing table and apply the hash function to the portion of the header information in parallel.

19. The network device of claim 12, further comprising:
  a service module configured to apply one or more services to an initial packet of the packet flow, wherein the packet forwarding engine is configured to determine a next hop for the initial packet, and, after the service module applies the one or more services to the initial packet, forward the initial packet to the next hop.

20. A non-transitory computer-readable storage medium is encoded with instructions for causing one or more programmable processors of a network device to:

select, from a plurality of subscribers, a subset of the plurality of subscribers that each is associated with a respective predicted amount of future network traffic greater than a threshold amount of network traffic;

pre-assign, prior to receiving initial packets for packet flows from the plurality of subscribers, each subscriber of the subset of subscribers to a corresponding one or more of a plurality of computing resources of the network device to the process packet flows from the subset of subscribers;

receive a packet flow from a subscriber, wherein the subscriber is one of the plurality of subscribers;

determine whether any of the plurality of computing resources of the network device is pre-assigned to process the packet flow from the subscriber;

responsive to determining that a first computing resource is pre-assigned to process the packet flow from the subscriber, direct the packet flow to the first computing resource; and responsive to determining that none of the plurality of computing resources are pre-assigned to process the packet flow:
  dynamically identify one of the plurality of computing resources to process the packet flow; and
  direct the packet flow to the one computing resource.

* * * * *